United States Patent
Yu

(10) Patent No.: US 7,792,135 B2
(45) Date of Patent: Sep. 7, 2010

(54) DEVICE AND METHOD OF CONSTRUCTING GENERATION MATRIX FOR LINEAR BLOCK CODING, CODING DEVICE AND DECODING DEVICE USING THE GENERATION MATRIX

(75) Inventor: Jung-pil Yu, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 223 days.

(21) Appl. No.: 11/971,254

(22) Filed: Jan. 9, 2008

(65) Prior Publication Data

US 2009/0028190 A1    Jan. 29, 2009

(30) Foreign Application Priority Data

Jul. 24, 2007    (KR) .................. 10-2007-0074024

(51) Int. Cl.
*H04B 7/216* (2006.01)
(52) U.S. Cl. ...................................... 370/441
(58) Field of Classification Search ............ None
See application file for complete search history.

(56) References Cited

U.S. PATENT DOCUMENTS

2008/0028281 A1 * 1/2008 Miyazaki et al. ............ 714/776
2009/0204876 A1 * 8/2009 Costa et al. .................. 714/801

* cited by examiner

*Primary Examiner*—Chi H Pham
*Assistant Examiner*—Fan Ng
(74) *Attorney, Agent, or Firm*—Staas & Halsey LLP

(57) ABSTRACT

A method of constructing a generation matrix of a linear block code. The method includes setting a number of relation lines connected for respective codeword packet nodes if a number of massage packet nodes and the number of codeword packet nodes are selected; setting a number of relation lines connected for the respective message packet nodes; connecting the message packet nodes and the codeword packet nodes with the relation lines, the number of which is as many as the set number; and constructing the generation matrix of the linear block code based on the connection relation between the message packet nodes and the codeword packet nodes. Accordingly, the generation matrix for effectively performing a linear block coding of a message in the unit of a packet can be constructed.

20 Claims, 12 Drawing Sheets

$$G = \begin{bmatrix} 0 & 0 & 1 & 1 & 1 & 1 & 0 & 0 & 0 & 1 \\ 0 & 1 & 1 & 0 & 1 & 0 & 0 & 1 & 1 & 0 \\ 0 & 1 & 0 & 1 & 1 & 0 & 1 & 1 & 0 & 0 \\ 0 & 0 & 1 & 1 & 1 & 1 & 0 & 0 & 0 & 1 \\ 1 & 0 & 0 & 1 & 1 & 0 & 0 & 1 & 1 & 0 \end{bmatrix}$$

DEVICE AND METHOD OF CONSTRUCTING GENERATION MATRIX FOR LINEAR BLOCK CODING, CODING DEVICE AND DECODING DEVICE USING THE GENERATION MATRIX

CROSS-REFERENCE TO RELATED APPLICATION

This application claims all the benefit of Korean Application No. 2007-74024, filed in the Korean Intellectual Property Office on Jul. 24, 2007, the disclosure of which is incorporated herein by reference.

BACKGROUND OF THE INVENTION

1. Field of the Invention

Aspects of the present invention relate to a device and method of constructing a generation matrix, a coding device and a decoding device using the generation matrix, and more particularly, to a device and method of constructing a generation matrix for performing a linear block coding of a message that is received in the unit of a packet, a coding device and a decoding device using the generation matrix.

2. Description of the Related Art

With the introduction of the information society, users' demand for further improved communication technology is increasing. Accordingly, as a part of efforts to develop digital communication technology, efforts to develop error correction coding technology have been made.

Error correction coding technology has been developed from initial block coding used in the past to the present repeated demodulation code, such as a low-density parity-check (LDPC) code or turbo code. These coding methods detect and correct errors generated due to deterioration of a transmitted signal in a channel, and are mainly used in a physical layer of a communication layer.

The use of such an error correction coding technology even in an upper layer of the physical layer has been discussed. If the correction of data processed in the physical layer and sent to an upper layer is impossible, the upper layer considers the data to have been erased (or lost). A channel through which data is transmitted that cannot be corrected, or through which no data is received due to the erasure of the data itself, is generally called an erasure channel.

As an error correction coding technology for retrieving data in spite of the erasure channel, a parity check code, a Reed Solomon code, and the like, have been generally used. However, since such a code has relatively a short codeword length, it is not practical to apply the code to an environment such as the erasure channel. Consequently, a need exists for an error correction coding technology for an erasure channel that can have a long codeword.

Accordingly, efforts for applying a linear block coding technology to an erasure channel have been made. In order to perform the linear block coding, a generation matrix for converting a message into codewords is required. Consequently, there is a rising need for a method capable of constructing a generation matrix that makes it possible to perform a linear block coding with a long codeword in units of a packet.

SUMMARY OF THE INVENTION

Aspects of the present invention relate to a device and method of constructing a generation matrix used for a linear block coding, a recording medium for storing an execution code for executing the method of constructing the generation matrix, a coding device and a decoding device using the generation matrix constructed by the method.

According to an aspect of the present invention, a method of constructing a generation matrix of a linear block code is provided. The method comprises setting a number of relation lines connected for respective codeword packet nodes if a number of message packet nodes and the number of codeword packet nodes are selected; setting a number of relation lines connected for the respective message packet nodes; connecting the message packet nodes and the codeword packet nodes with the relation lines, the number of which is as many as the set number; and constructing the generation matrix of the linear block code based on the connection relation between the message packet nodes and the codeword packet nodes.

According to another aspect of the present invention, setting of the number of the relation lines connected for the codeword packet nodes comprises: calculating a distribution of the numbers of relation lines for all of the codeword packet nodes; calculating a number of codeword packet nodes having i relation lines for respective i values; constructing a table having a number of rows equal to a maximum value among the i values and a number of columns equal to a number of codeword packet nodes having a number of relation lines corresponding to the respective rows; and determining the numbers of relation lines for the respective codeword packet nodes by successively assigning each of the codeword packet nodes to cells of the constructed table; wherein i is an integer in the range of 1 to k (where, k is the total number of the message packet nodes).

According to another aspect of the present invention, the constructing of the table comprises constructing the table so that the respective rows have the same size and the size of the column existing in the respective row is in reverse proportion to the number of columns for the respective row.

According to another aspect of the present invention, the determining of the numbers of relation lines comprises assigning a number of codeword packet nodes equal to the number of rows to cells the constructed table in a predetermined order along the leftmost column of the constructed table, confirming start positions of the following columns, and assigning the remaining codeword packet nodes to cells in the columns from the first-starting row according to the confirmed start positions.

According to another aspect of the present invention, the setting of the relation lines connected for the message packet nodes comprises calculating a sum of relation lines of all of the codeword packet nodes; dividing the calculated sum of the relation lines by the number of message packet nodes, and setting the quotient obtained as the number of relation lines for all of the message packet nodes; and additionally setting a number of relation lines with respect to the message packet nodes corresponding to the remainder, if a remainder exists as a result of division.

According to another aspect of the present invention, the connecting of the message packet nodes and the codeword packet nodes comprises successively numbering the relation lines set for all of the codeword packet nodes; successively numbering the relation lines set for all of the message packet nodes; determining, in a predetermined order, the numbers of relation lines for the message packet nodes corresponding to the numbers of relation lines set for all of the codeword packet nodes; and connecting the relation lines having the determined numbers to each other so that one relation line is connected between one message packet node and one codeword packet node.

According to another aspect of the present invention, the determining the numbers of relation lines comprises calculating the numbers of relation lines for the corresponding message packet nodes by successively substituting the numbers of relation lines set for all of the codeword packet nodes into the following equation, $$m=f(j)=(P*j+D_{(j \bmod Q)}) \bmod T$$

where, m denotes the number of relation lines set in a message packet, j denotes the number of relation lines set in a codeword packet node, P, $D_0$, $D_1$, $D_2$, ..., $D_{Q-1}$ denote predetermined real numbers, and T is the total number of the relation lines.

According to another aspect of the present invention, the constructing of the generation matrix comprises defining the generation matrix of the linear block code by providing a number of rows equal to the number of the message packet nodes and a number of columns equal to the number of the codeword packet nodes and by entering "1" in matrix positions that correspond to the message packet nodes and the codeword packet nodes connected to each other and entering "0" in remaining matrix positions.

According to another aspect of the present invention, a linear block coding device is provided, which comprises a transmitter-side storage unit to store a matrix generated by the above-described method; and a coding unit to perform a linear block coding of input message packets using the matrix stored in the transmitter-side storage unit if the message packets are inputted, and to output codeword packets for the respective message packets.

According to still another aspect of the present invention, a linear block decoding device is provided. The linear block coding device comprises a receiver-side storage unit to store a matrix generated by the above-described method; and a decoding unit to perform a linear block decoding of input codeword packets using the matrix stored in the receiver-side storage unit if the codeword packets are inputted, and to retrieve data carried on an erasure channel.

According to still another aspect of the present invention, a recording medium in which an execution code to execute the method of constructing the generation matrix is stored is provided.

According to still another aspect of the present invention, a device to construct a generation matrix of a linear block code is provided. The device comprises a setting unit to set a number of relation lines connected for respective codeword packet nodes and a number of the relation lines connected for respective message packet nodes, if a number of the massage packet nodes and a number of the codeword packet nodes are selected; and a generation matrix construction unit to construct the generation matrix of the linear block code according to a connection relation between the message packet nodes and the codeword packet nodes that are connected to each other with the relation lines, the number of which is as many as the set number.

According to another aspect of the present invention, the setting unit comprises a calculation unit to calculate a distribution of the numbers of relation lines for all of the codeword packet nodes and to calculate the number of codeword packet nodes having i relation lines among all of the codeword packet nodes for respective i values; and a first degree determining unit to construct a table having a number of rows equal to a maximum value among the i values and a number of columns equal to the number of codeword packet nodes having a number of relation lines corresponding to the respective rows and to determine the numbers of relation lines for the respective codeword packet nodes by successively making the whole codeword packet nodes correspond to the constructed table. In this case, i may be an integer in the range of 1 to k, and k is the number of the whole message packet nodes.

According to another aspect of the present invention, the first degree determining unit constructs the table so that the respective rows have the same size and the size of the column existing in the respective row is in reverse proportion to the number of columns for the respective row.

According to another aspect of the present invention, the first degree determining unit assigns a number of the codeword packet nodes equal to the number of rows to cells in the constructed table in a predetermined order along the leftmost column of the constructed table, confirms a size of columns of the respective row, and assigning remaining codeword packet nodes to cells in a smallest column of the respective row.

According to another aspect of the present invention, the setting unit further comprises a second degree determining unit to calculate a sum of the relation lines of all of the codeword packet nodes, to divide the calculated sum of the relation lines by the total number of the message packet nodes, to set the resulting quotient as the number of relation lines for the whole message packet nodes, and to additionally set remaining relation lines with respect to the message packet nodes if a remainder exists as a result of division.

According to another aspect of the present invention, the generation matrix construction unit comprises a connection unit to successively number the relation lines set for all of the codeword packet nodes and the relation lines set for all of the message packet nodes, to determine in a predetermined order the numbers of relation lines for the message packet nodes corresponding to the numbers of relation lines set for the whole codeword packet nodes, and to connect the determined relation lines to each other; and a construction unit to construct the generation matrix by providing a number of rows equal to the total number of the message packet nodes and a number of columns equal to the total number of the codeword packet nodes and by entering "1" in matrix positions that correspond to the message packet nodes and the codeword packet nodes connected to each other and entering "0" in remaining matrix positions.

According to another aspect of the present invention, the connection unit confirms the numbers of relation lines for the corresponding message packet nodes by successively substituting the numbers of relation lines set for the codeword packet nodes in the following equation, $$m=f(j)=(P*j+D_{(j \bmod Q)}) \bmod T$$

where, m denotes the number of relation lines set in a message packet, j denotes the number of relation lines set in a codeword packet node, P, $D_0$, $D_1$, $D_2$, ..., $D_{Q-1}$ denote predetermined real numbers, and T is the number of the whole relation lines.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A to 5D are views explaining a process of setting relation lines for codeword packet nodes according to an embodiment of the present invention;

FIG. 7 is a view illustrating a generation matrix corresponding to a connection relation between message packet nodes and codeword packet nodes connected to each other as illustrated in FIG. 5B;

DETAILED DESCRIPTION OF THE EMBODIMENTS

Figure 1:
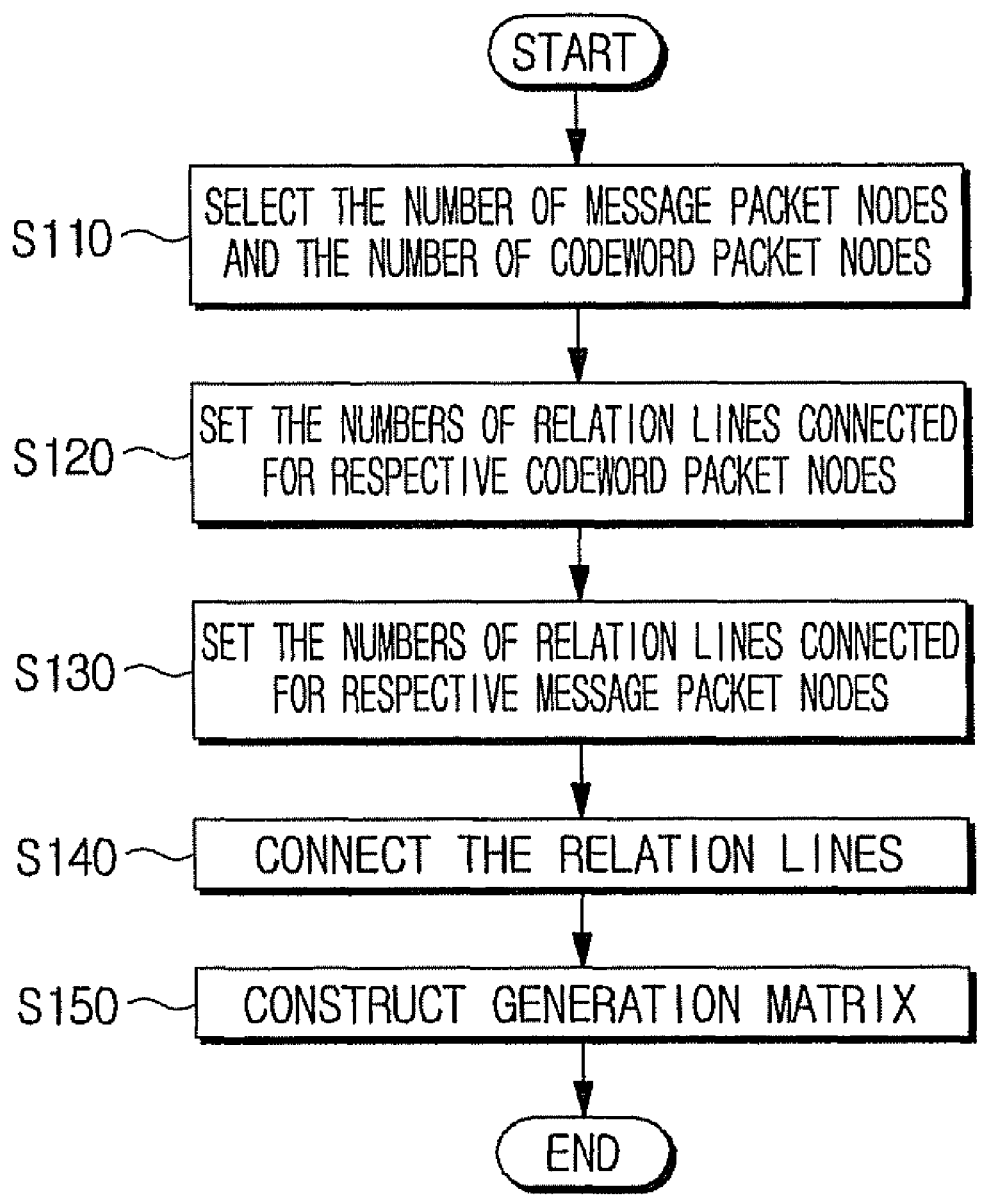
FIG. 1 is a flowchart illustrating a process of constructing a generation matrix according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a process of constructing a generation matrix of a linear block code according to an embodiment of the present invention. In order to construct a generation matrix, the number of message packet nodes and the number of codeword packet nodes are first selected. A designer can select the number of generation matrices suitable to a digital communication environment to which the generation matrices are to be applied at operation S110. A message packet node or a codeword packet node can be expressed as binary data of a certain length rather than one bit or byte. The message packet node may be implemented by a memory region in which such data is stored. The message packet node may also be implemented by a virtual node that refers to a message packet itself inputted from an outside. In the same manner, a codeword packet node may be implemented by a virtual node that refers to a resultant value of coding a message packet or by a memory region in which such a resultant value is stored.

The message packet nodes may have the same size. The respective codeword packet nodes refer to values obtained by XOR-gating corresponding matrix values by applying the generation matrix to the message packet nodes. Accordingly, the respective codeword packet nodes also have the same size as the message packet nodes. A coding rate is determined according to the number of message packet nodes and the number of codeword packet nodes. For example, if two message packet nodes and six codeword packet nodes are selected, the number of packets is increased from two to six, and thus the coding rate becomes ⅓.

If the number of nodes is selected as described above, the number of relation lines connected for the respective codeword packet nodes is set at operation S120. A relation line refers to a connection between a message packet node and a codeword packet node. The number of relation lines is directed to the degree of the corresponding nodes. Using the above example, the relation lines indicate how the two message packet nodes and six codeword packet nodes are related to each other, and thus the generation matrix can be constructed accordingly. In the above-described example, since the number of message packet nodes is two, the number of relation lines that can be set for the respective codeword packet node is one or two. In order to construct the generation matrix, which codeword packet node has one relation line and which codeword packet node has two relation lines is set. A process of setting the numbers of relation lines for each one of the codeword packet nodes will be described later.

The numbers of relation lines connected for the message packet nodes are set at operation S130. The relation line set for the respective message packet node refers to a connection line connecting to the relation line set for the respective codeword packet node. The relation lines set for the respective codeword packet nodes and the relation lines set for the respective message packet nodes are connected to each other in a predetermined order at operation S140. Accordingly, the generation matrix is constructed according to the connection relation between the message packet nodes and the codeword packet nodes at operation S150. By performing the coding using the matrix constructed as above, data retrieval may be performed in spite of an erasure channel existing in the decoding process.

Figure 2:
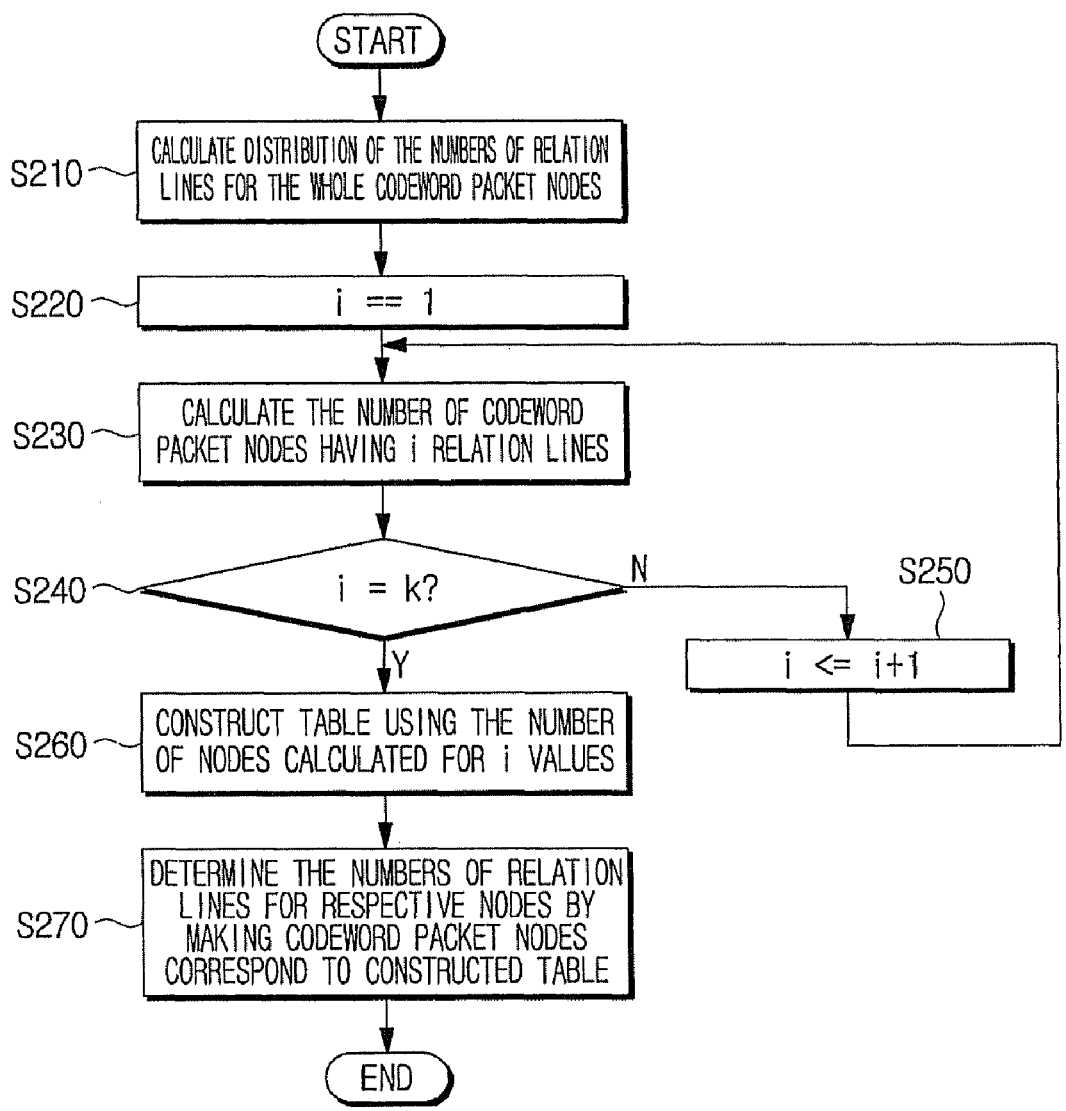
FIG. 2 is a flowchart illustrating in detail a process of setting relation lines for codeword packet nodes according to an embodiment of the present invention.

FIG. 2 is a flowchart of an example of a process of setting relation lines for codeword packet nodes according to an embodiment of the present invention. The distribution of the numbers of relation lines for all of the codeword packet nodes is calculated at operation S210. For example, if k message packet nodes and n codeword packet nodes are selected, the coding rate becomes k/n. The message packet nodes can be expressed as u1, u2, ..., uk, and the codeword packet nodes can be expressed as v1, v2, ..., vn. In this case, the distribution rate ρi of the numbers of relation lines for the whole codeword packet nodes may be obtained through Equation (1).

$$F = \frac{\ln\delta + \ln(\varepsilon/2)}{\ln(1-\delta)} \qquad (1)$$

$$\rho 1 = 1 - \frac{1 + 1/F}{1 + \varepsilon}$$

$$\rho i = \frac{1 - \rho 1}{\left(\left(1 - \frac{1}{F}\right)i(i-1)\right)} \text{ when, } i = 2, \ldots, F$$

In Equation (1), $\varepsilon$ and $\delta$ denote preset real number parameters, and $\rho i$ denotes a ratio of i-th degree nodes, i.e., nodes having i relation lines, to the total number of codeword packet nodes. The values of $\varepsilon$ and $\delta$ may be set by confirming, through repeated experiments, the parameter values when the coding performance is good. By constructing a generation matrix as successively changing the values of $\varepsilon$ and $\delta$ and then confirming the coding and decoding performance of the constructed generation matrix, the optimum parameter value experimentally calculated and set.

Since the number of the whole codeword packet nodes is n, the number of codewords Ni having i relation lines can be obtained as Ni=n*ρi. Ni should be a natural number, and in that case, the value N1+N2+ . . . +Nn obtained by adding the numbers of codeword packet nodes for all degrees i necessarily becomes n. If the value of Ni=n*ρi is not a natural number, the value may be adjusted through rounding off or rounding down the fractions.

Since i is in the range of 1 to k, the number of nodes Ni for the respective relation line can be obtained. By initially setting i to i=1 at operation S220, the number of codeword packet nodes, each of which has one relation line, is calculated at operation S230. If i does not equal k at operation S240, i+1 is set as a new i at operation S250. By setting i=2, the number of codeword packet nodes having two relation lines is calculated at operation S230. By repeating the above-described process until i becomes k, the number of codeword node packets having the corresponding number of relation lines can be known for 1 to k relation lines.

A table is constructed using the number of nodes calculated for i values at operation S260. The table is a conceptual device used to determine how many relation lines are to be allocated to the respective codeword node packet, and is written in a memory, such as a RAM, to be used in determining the numbers of relation lines.

As described above, if the codeword node packets are expressed as v1, v2, . . . , vn, and the maximum value of i, i.e., the maximum number of relation lines connected to one codeword packet node is m, a table having m rows and a number of columns equal to the number of codeword packet nodes having a number of relation lines corresponding to each row is constructed. In this case, the respective rows of the table have the same size, and the size of columns existing in the respective rows is in reverse proportion to the number of columns for the respective rows. If the table is constructed as described above, the numbers of relation lines for the respective codeword packet nodes are determined by assigning each of the codeword packet nodes to cells of the table at operation S270.

The order of assigning the codeword packet nodes to cells of the table may be set in several ways. For example, the codeword packet nodes, the number of which is as many as the number of rows, are made to correspond to the constructed table in a predetermined order along the leftmost column of the constructed table. The remaining codeword packet nodes are arranged for the following columns. In this case, start positions of the following columns are confirmed, and the codeword packet node is preferentially arranged from the confirmed first-starting column. After the codeword packet nodes are assigned to cells of the table, the numbers of relation lines to be connected to the respective codeword packet nodes are set according to the corresponding positions of the codeword packet nodes. The relation lines, the number of which corresponds to the order of the row, is set to be connected to the codeword packet nodes arranged in the respective row. Thus, x relation lines are connected to the codeword packet nodes arranged in the x-th row. As described above, the numbers of relation lines to be connected can be set with respect to the respective codeword packet nodes.

Figure 3:
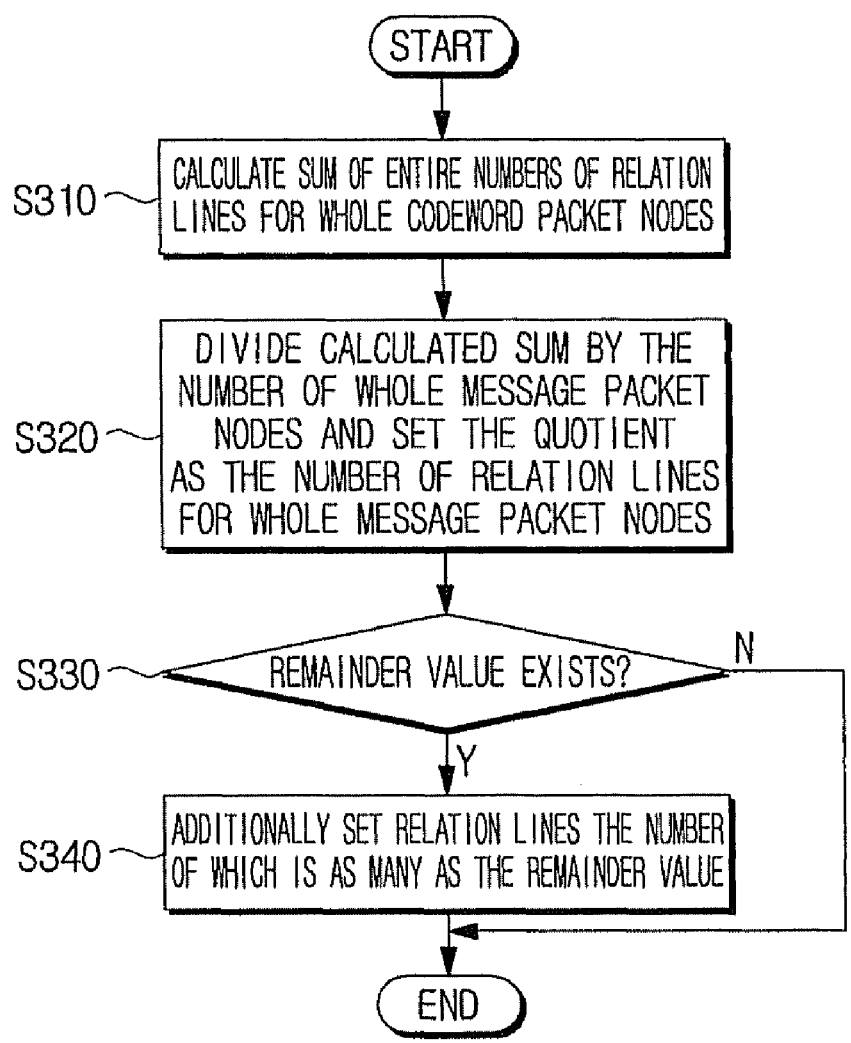
FIG. 3 is a flowchart illustrating in detail a process of setting relation lines for message packet nodes according to an embodiment of the present invention.

FIG. 3 is a flowchart of a process of setting relation lines for message packet nodes according to an embodiment of the present invention. If the relation lines for the respective codeword packet nodes are set, the total number of the relation lines is calculated for all of the codeword packet nodes through addition at operation S310. The calculated value is divided by the total number of the message packet nodes k. The quotient obtained as a result of division is set as the number of relation lines for the whole message packet nodes at operation S320. Since the value calculated at operation S310 is the same as the total number of the relation lines to be set for the whole message packet nodes, the division of the value by k indicates that the relation lines are almost uniformly distributed to the whole message packet nodes.

However, a remainder value may exist as a result of dividing the calculated value by k. Accordingly, whether a remainder value exists is determined at operation S330, and the relation lines, the number of which is as many as the remainder value, are additionally set at operation S340. Although the order of additional setting may be optionally determined, it is preferable to successively add the relation lines starting from the initial message packet node.

For example, if the calculated value is 15 and the number of message packet nodes is 4, the quotient of 15/4 is 3, and the remainder is 3. Accordingly, one relation line is additionally allocated to each of three message packet nodes. As a result, among four message packet nodes, the first to third message packet nodes are allocated with 4 (3+1) relation lines, and the fourth message packet node is allocated with three relation lines.

Figure 4:
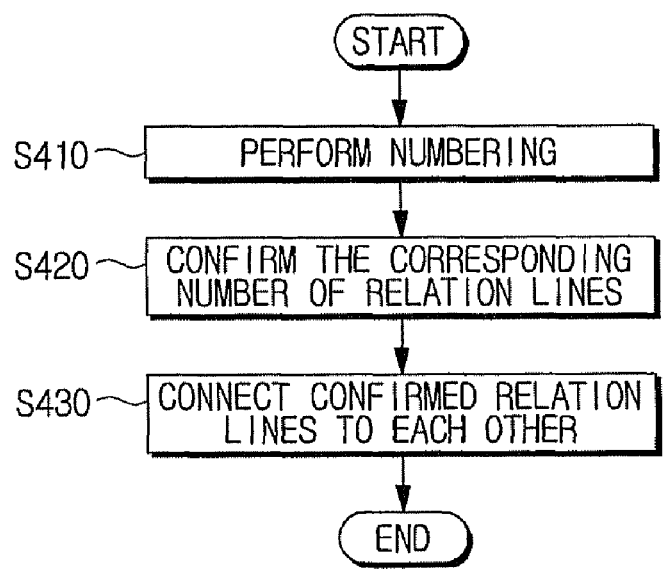
FIG. 4 is a flowchart illustrating in detail a connection process between message packet nodes and codeword packet nodes according to an embodiment of the present invention.

FIG. 4 is a flowchart of a connection method between message packet nodes and codeword packet nodes. The relation lines set for the message packet nodes and the codeword packet nodes are successively numbered at operation S410. As described above, if the total number of the relation lines is 15, numbers in the range of 0 to 14 are given to the respective relation lines.

The corresponding relation-line numbers are confirmed at operation S420. In this case, the corresponding numbers may be confirmed using a predefined equation. The 1:1 correspondence between the codeword packet node numbers and the message packet node numbers can be confirmed using Equation (2).

$$m=f(j)=(P*j+D_{(j\bmod Q)})\bmod T \qquad (2)$$

In Equation (2), m denotes the number of relation lines set in a message packet, and j denotes the number of relation lines set in a codeword packet node. P, Q, $D_0$, $D_1$, $D_2$, . . . , $D_{Q-1}$ denote predetermined parameters. The above-described parameters may be calculated and set to optimum values through repeated experiments, or may be set to certain values by a designer.

If the corresponding numbers are confirmed, the relation lines of the confirmed numbers are connected to each other at operation S430. As a result, a connection relation between the message packet nodes and the codeword packet nodes is obtained. Accordingly, a generation matrix that reflects the connection relation can be constructed.

FIGS. 5A to 5D, 6A and 6B are views explaining a process of constructing a generation matrix, and FIG. 7 is shows an example of a generation matrix constructed through the above-described process. Hereinafter, a process of constructing a generation matrix according to an embodiment of the present invention will be described through simple examples with reference to FIGS. 5A to 5D, 6A, and 6B.

If five message packet nodes and 10 codeword packet nodes are selected, the coding rate becomes 5/10, i.e., ½. The message packet nodes may be expressed as u1, u2, . . . , u5, and the codeword packet nodes may be expressed as v1, v2, . . . , v10.

If two parameters ϵ and δ are set to 0.25 and 0.05, respectively, ρ values can be obtained as follows through Equation (1). ρ values are calculated as ρ1=0.192, ρ2=0.400, ρ3=0.133, ρ4=0.067, ρ5=0.05, ρi<0.03 (i≧6). If i is 6 or more, ρi is below 0.03, and thus is disregarded. In this case, the number of relation lines is set to 5 at maximum.

As described above, the number of nodes for the respective relation line can be obtained using the equation Ni=n*ρi. The numbers of nodes can be determined as N1=2, N2=4, N3=2, N4=1, N5=1. In this case, if the resultant value of Ni operation includes fractions, the minimum integer value that is larger than the resultant value is set as Ni. Thus, if n is 10, the numbers of nodes are obtained as N1=1.92, N2=4.00, N3=1.33, N4=0.67, N5=0.5, and thus can be finally set to N1=2, N2=4, N3=2, N4=1, N5=1. In this case, the sum of the numbers becomes N1+N2+N3+N4+N5=10.

Figure 5A:
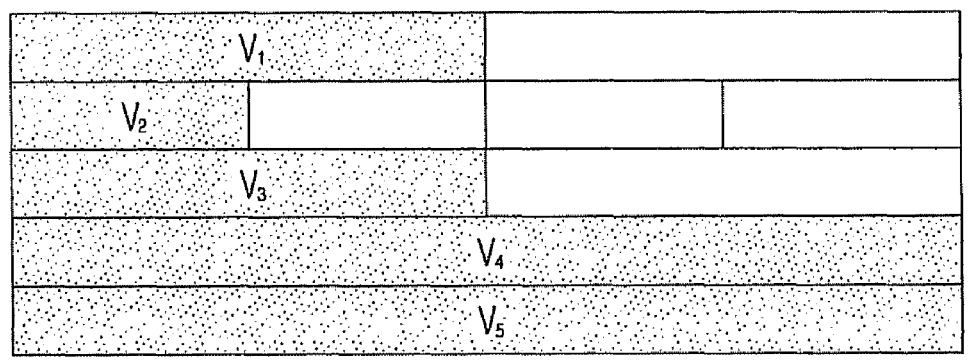

If the number of codeword nodes is determined for the respective number of relation lines i, a table like the one shown in FIG. 5A is constructed, based on the determined number of codeword nodes. As shown FIG. 5A, a table having rows the number of which corresponds to the maximum value of i, i.e., five rows, is constructed.

Each row of the table has at least one column. The number of columns that belong to each respective row is the same as the number of codeword packet nodes for the respective i value. In the above example, since N1=2, two columns are arranged in the first row, and since N2=4, four columns are arranged in the second row. In the same manner, in the third, fourth, and fifth rows, two columns, one column, and one column are arranged, respectively. The sizes of the rows are the same. Accordingly, the size of columns existing in the respective row is in reverse proportion to the number of columns that belong to the corresponding row. Thus, as more columns are arranged in a given row, the size of the columns in that row becomes smaller.

If the table is constructed, the codeword packet nodes are made to successively correspond to the table from the leftmost column, as shown in FIG. 5A. As shown in FIG. 5A, since five rows exist in all, the codeword packet nodes v1 to v5 are made to correspond to the leftmost columns of the table in a specified order. Although, in FIG. 5A, it is exemplified that the packet nodes correspond to the table in the order of v1 to v5, the order of corresponding may be determined in any fashion, according to other aspects of the invention.

Figure 5B:
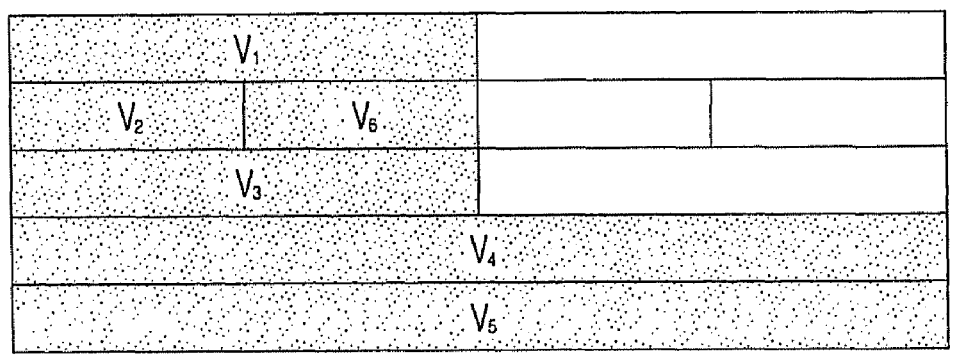

When the application of the codeword packet nodes to the leftmost columns is completed, the codeword packet nodes are made to correspond to the columns having not yet corresponded to the codeword packet nodes, as shown in FIG. 5B. The corresponding order of the codeword packet nodes is controlled according to start positions of the columns having not yet corresponded to the codeword packet nodes of the respective rows. Thus, v6 is made to correspond to the leftmost column of the second row which has not yet corresponded to the codeword packet nodes, as shown in FIG. 5B.

Figure 5C:
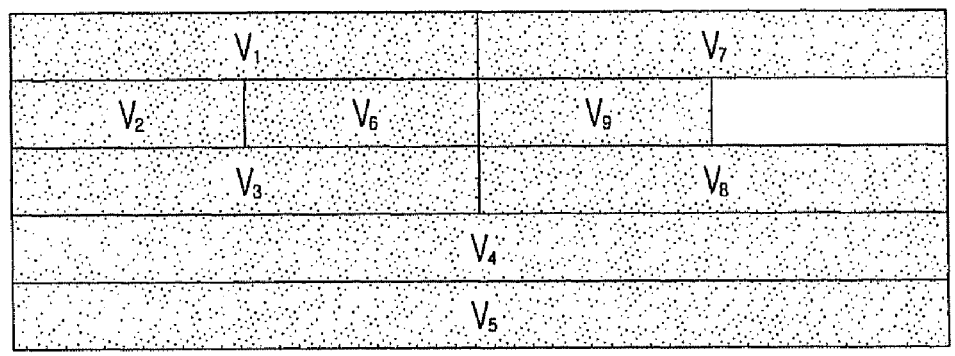

Referring to FIG. 5C, after v6 is made to correspond to the leftmost column of the second row, the first to third rows have the same start position of the columns having not yet corresponded to the codeword packet nodes. Accordingly, v7 to v9 are made to correspond to the columns of the first to third rows having the same start position. In FIG. 5C, it is exemplified that the packet nodes correspond to the table in the order of v7, v9, and v8. However the order of corresponding may be adjusted according to other aspects of the present invention.

Figure 5D:
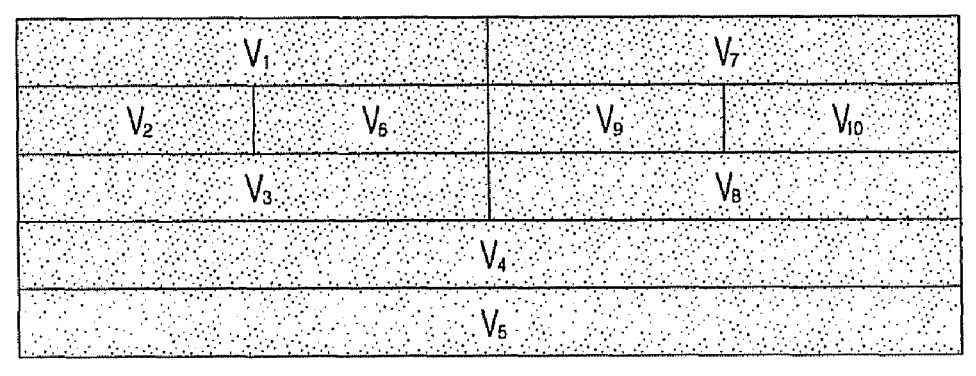

Then, as shown in FIG. 5D, v10 is made to correspond to the last remaining row and column position. Accordingly, table contents are all written, and thus the numbers of relation lines connected to the respective codeword packet nodes are determined. The relation lines, the numbers of which are 1, 2, 3, 4, 5, 2, 1, 3, 2, and 2, are set with respect to the codeword packet nodes v1 to v10.

Since the sum of the numbers of the relation lines is 25 and the number of message packet nodes is 5, 5 relation lines are equally set for the respective message packet nodes. Accordingly, the numbers are successively given to the relation lines set for the message packet nodes and the codeword packet nodes.

Figure 6A:
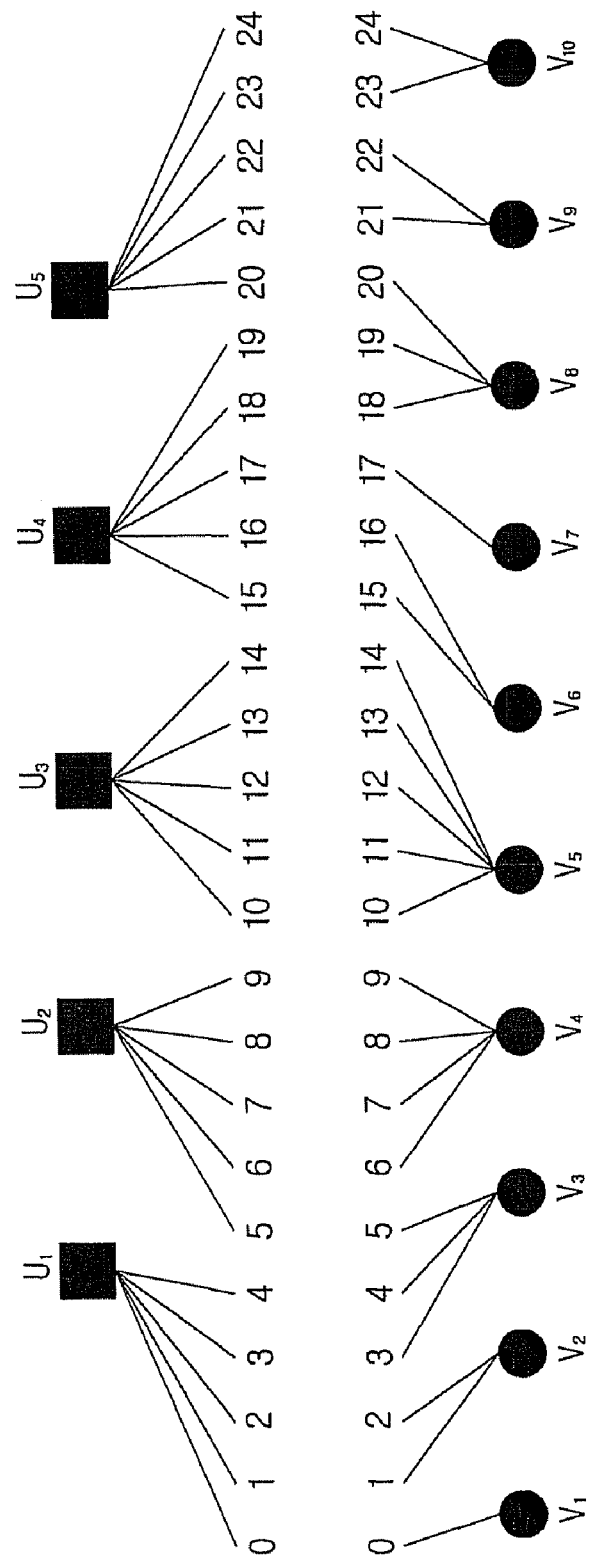
FIGS. 6A and 6B are views explaining a connection process between message packet nodes and codeword packet nodes according to an embodiment of the present invention.

FIG. 6A is a view of a state that the numbers are given to the respective relation lines. As shown in FIG. 6A, it can be seen that the numbers in the range of 0 to 24 have been given to the relation lines set for the message packet nodes u1 to u5 and the codeword packet nodes v1 to v10. Accordingly, in order to confirm the 1:1 correspondence between the respective relation lines, j values are successively applied to Equation (2) as described above. For example, if P, Q, $D_0$, $D_1$, and $D_2$ are set to 7, 3, 23, 5, and 16, respectively, it can be known that m is m=(7*0+$D_0$) mod 25=23 mod 25=23 when j is j=0. Accordingly, it can be confirmed that the $0^{th}$ relation line of the codeword packet node side corresponds to the $23^{rd}$ relation line of the message packet node side. In this manner, m values corresponding to the respective j are obtained as (0, 23), (1, 12), (2, 5), (3, 19), (4, 8), (5, 1), (6, 15), (7, 4), (8, 22), (9, 11), (10, 0), (11, 18), (12, 7), (13, 21), (14, 14), (15, 3), (16, 17), (17, 10), (18, 24), (19, 13), (20, 6), (21, 20), (22, 9), (23, 2), and (24, 16).

Figure 6B:
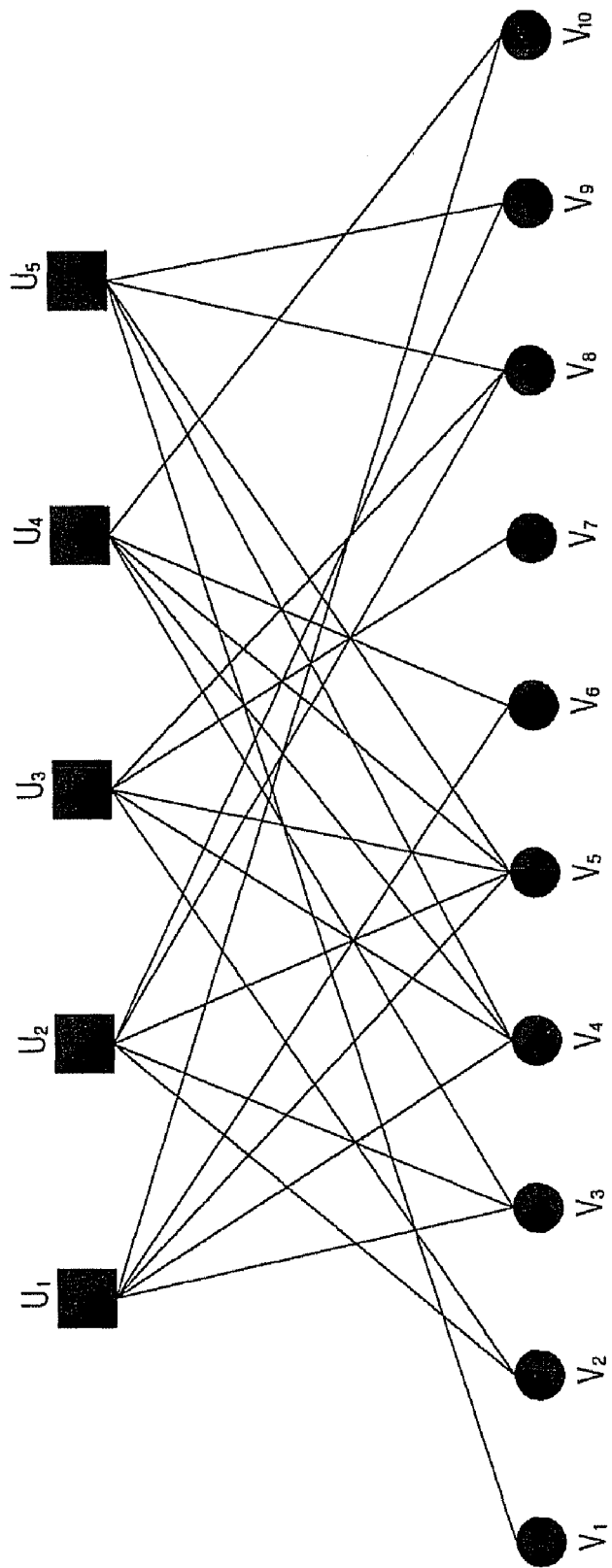

By connecting the relation lines according to the corresponding relation as obtained above, a graph as shown in FIG. 6B can be obtained. As shown in FIG. 6B, it can be seen that 5 message packet nodes and 10 codeword packet nodes are connected to one another through a plurality of relation lines.

In the process of calculating the (j, m) values through Equation (2), plural relation lines should not exist between one message packet node and one codeword packet node. That is, by properly setting the parameter values such as P, Q, $D_0$, $D_1$, $D_2$, . . . , $D_{Q-1}$ required to operate Equation (2), it is preferable to design the generation matrix so that plural relation lines do not exist between two nodes.

FIG. 7 is a view of a generation matrix constructed using the corresponding relation as shown in FIG. 6B. Referring to FIG. 7, the number of rows in the generation matrix is equal to the total number of message packet nodes, and the number of columns in the generation matrix is equal to the total number of codeword packet nodes. The generation matrix is composed of "0" and "1", and may be constructed in a manner that "1" is written in matrix positions corresponding to the nodes connected by relation lines, and "0" is written in other positions.

As shown in FIG. 6B, the codeword packet nodes connected to the first message packet node are v3, v4, v5, v6, v10. Accordingly, the first row is expressed as 0,0,1,1,1,1,0,0,0,1. In the same manner, the remaining rows can be constructed. As a result, a generation matrix G as shown in FIG. 7 can be obtained.

Figure 8:
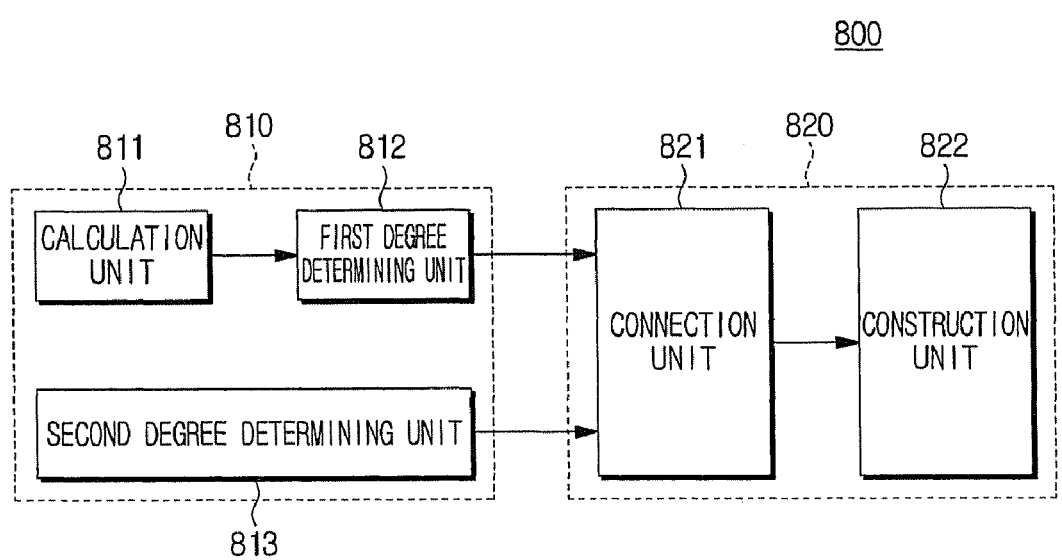
FIG. 8 is a block diagram illustrating the construction of a device for constructing a generation matrix according to an embodiment of the present invention.

FIG. 8 is a block diagram of a device 800 for constructing a generation matrix, which performs the method of constructing a generation matrix as described above with reference to FIGS. 1 to 7, according to an embodiment of the present invention. The device 800 comprises a setting unit 810 and a generation matrix construction unit 820. According to other aspects of the invention, the device 800 may include additional and/or different components. Similarly, the functionality of the above units may be integrated into a single component.

The setting unit 810 sets the numbers of relation lines connected for respective codeword packet nodes and the numbers of relation lines connected for respective message packet nodes if the number of message packet nodes and the number of codeword packet nodes are selected. The number of message packet nodes and the number of codeword packet nodes may be directly inputted by a user or a designer. For this purpose, the device 800 may further comprise a user interface (not shown), such as an LCD panel, a keyboard, an LED display panel, and so forth.

The setting unit 810 comprises a calculation unit 811, a first degree determining unit 812, and a second degree determining unit 813. The calculation unit 811, as described above with reference to FIG. 2, calculates a distribution of the numbers of relation lines for all of the codeword packet nodes, and calculates the number of codeword packet nodes having i relation lines among all of the codeword packet nodes for respective i values.

The first degree determining unit 812 determines the numbers of relation lines for the respective codeword packet nodes in the same manner as described above with reference to FIG. 2. The first degree determining unit 812 constructs a table having a number of rows equal to the largest value of the i values and a number of columns equal to the number of codeword packet nodes for the respective rows, and determines the numbers of relation lines for the respective codeword packet nodes by successively assigning each of the codeword packet nodes to cells of the constructed table.

The second degree determining unit 813 determines the numbers of relation lines for the respective message packet nodes in the same manner as described above with reference to FIG. 3. The second degree determining unit 813 calculates a sum of the entire numbers of relation lines of the whole codeword packet nodes, divides the calculated sum of the entire numbers of relation lines by the number of the whole message packet nodes, and sets a quotient obtained as a result of dividing the number of relation lines by the number of message packet nodes. In this case, if a remainder value exists as a result of the division, a number of relation lines equal to the remainder value are additionally set for the message packet nodes.

The generation matrix construction unit 820, as described above with reference to FIGS. 4 to 7, constructs the generation matrix of the linear block code according to a connection relation between the message packet nodes and the codeword packet nodes that are connected to each other with a number of relation lines equal to the set number.

The generation matrix construction unit 820 comprises a connection unit 821 and a construction unit 822. The connection unit 821 successively numbers the relation lines set for all of the codeword packet nodes and the relation lines set for all of the message packet nodes; determines, in a predetermined order, the numbers of relation lines for the message packet nodes corresponding to the numbers of relation lines set for all of the codeword packet nodes; and connects the determined relation lines to each other.

The construction unit 822 constructs the generation matrix by providing a number of rows equal to the number of message packet nodes and a number of columns equal to the number of the codeword packet nodes and by entering "1" in matrix positions that correspond to the message packet nodes and the codeword packet nodes connected to each other, and entering "0" in the remaining matrix positions.

The elements shown in FIG. 8 may be implemented by separate hardware chips to perform their respective function, or may be implemented by a single chip. In addition, the elements shown in FIG. 8 may be implemented by register regions that execute execution codes for performing the respective functions in a single chip.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Figure 9:
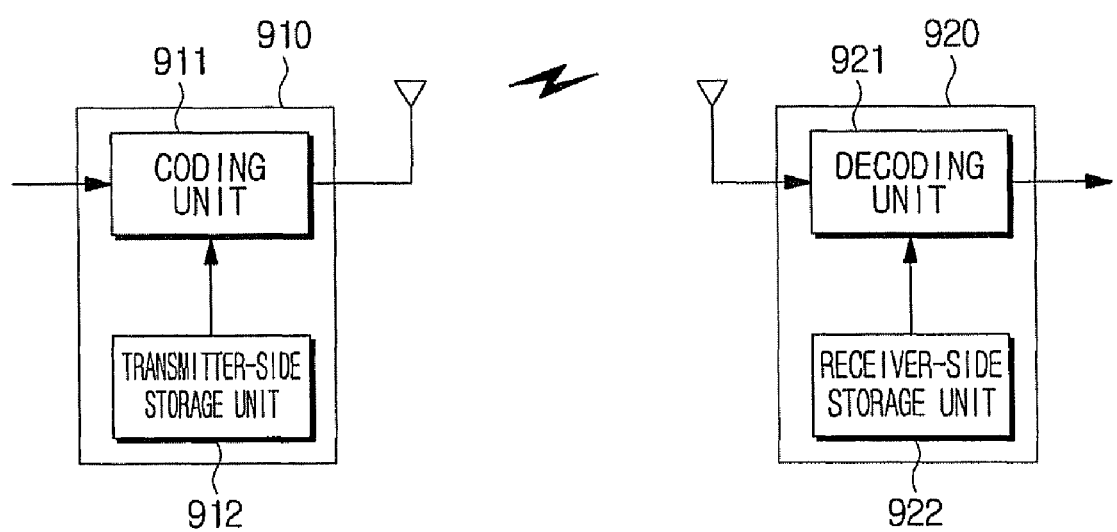
FIG. 9 is a block diagram illustrating the construction of a coding device and a decoding device using a generation matrix according to an embodiment of the present invention.

FIG. 9 is a block diagram of a coding device and a decoding device using a generation matrix constructed as above, according to an embodiment of the present invention. The linear block coding system comprises a coding device 910 provided on a transmitter side and a decoding device 920 provided on a receiver side.

The coding device 910 comprises a coding unit 911 and a transmitter-side storage unit 912. The transmitter-side storage unit 912 stores the generation matrix constructed as described above. If a message to be transmitted is inputted in the unit of a packet, the coding unit 911 performs a linear block coding of the input message packets using the generation matrix stored in the transmitter-side storage unit, and outputs codeword packets. In the case of using the generation matrix shown in FIG. 7, a codeword packet conversion process is expressed as follows.

$$V1=u5$$

$$v2=u2(+)u3$$

$$v3=u1(+)u2(+)u4$$

$$v4=u1(+)u3(+)u4(+)u5$$

$$v5=u1(+)u2(+)u3(+)u4(+)u5$$

$$v6=u1(+)u4$$

$$v7=u3$$

$$v8=u2(+)u3(+)u5$$

$$v9=u2(+)u5$$

$$v10=u1(+)u4$$

The decoding device 920 provided on the receiver side comprises a decoding unit 921 and a receiver-side storage unit 922. The receiver-side storage unit 922 stores the generation matrix constructed by the process of constructing a generation matrix as illustrated in FIG. 1.

The decoding unit 921 performs a linear block decoding of input codeword packets using the generation matrix stored in the receiver-side storage unit 922. In this case, even if an erasure channel is produced and a part of codeword packets is lost, data can be normally retrieved using other codeword packets. For example, if v2, v8, and v9 refer to the erasure channel, u5 and u3 are retrieved from v1 and v7. Then, u1 is retrieved from u1=v3(+)v4(+)v5(+)v6(+)v10. Thereafter, u4 is retrieved from v4=u1(+)u3(+)u4(+)u5. In addition, u2 can be confirmed from v3=u1(+)u2(+)u4. As described above, u1, u2, u3, u4, and u5, which are the original message packets, can be retrieved even though v2, v8, and v9 are lost. As a result, although a part of channels is lost, the message in the unit of a packet can be normally retrieved using codeword packets transmitted through other channels.

In determining whether the packet retrieval is possible in an actual application, an error detection code of the respective packet may be used. In addition, in an actual application, one output packet can correspond to a plurality of codeword packet nodes in a graph. In this case, one non-retrievable packet corresponds to a plurality of non-retrievable codeword packet nodes in a graph.

In the embodiments of the present invention as described above, it is exemplified that the degrees of the codeword packet nodes, i.e., the numbers of relation lines set for the respective nodes, are calculated using a table. However, such calculation can also be performed through a software algorithm.

Figure 10:
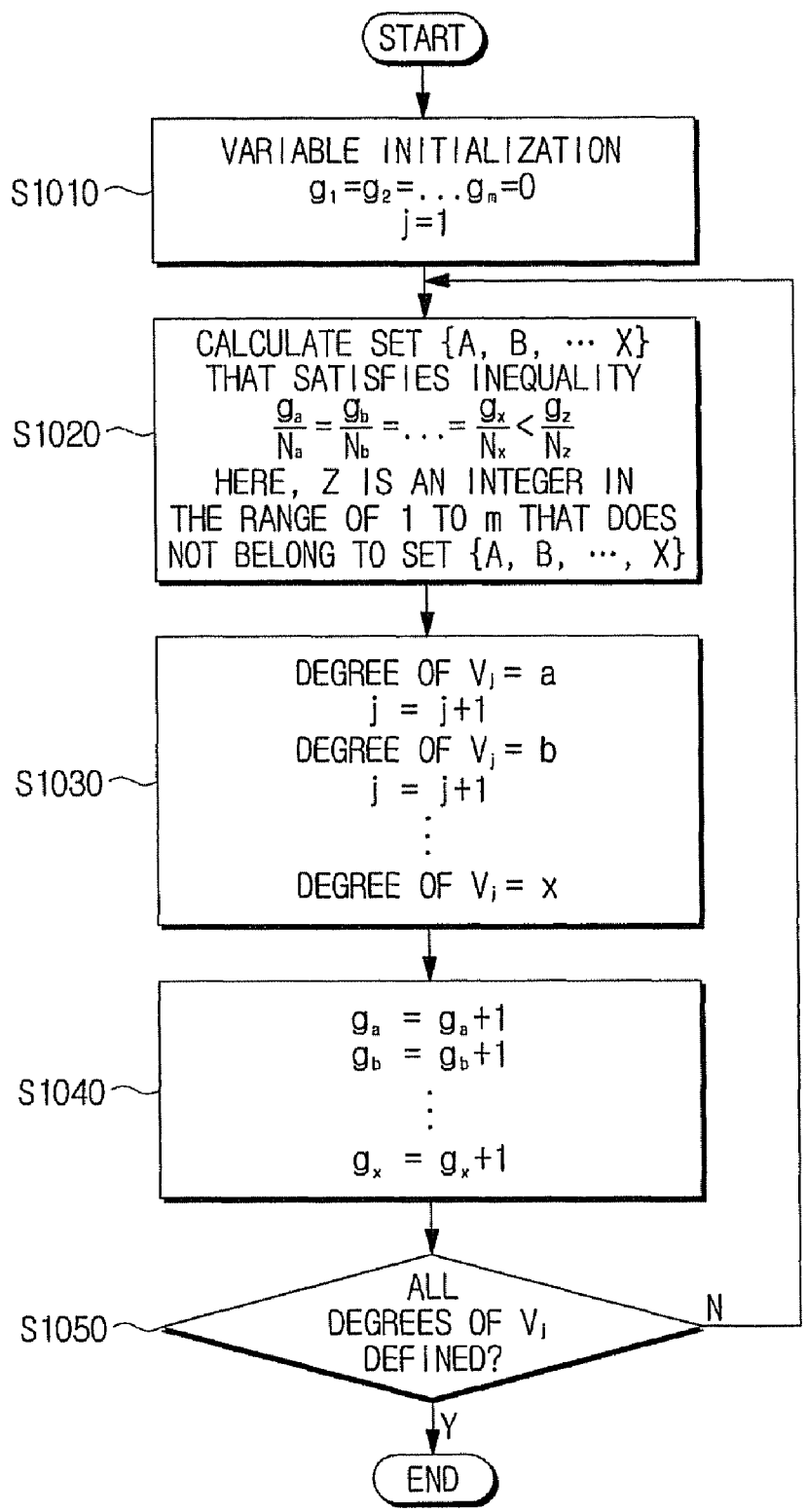
FIG. 10 is a flowchart illustrating an algorithm of performing a relation line setting process as illustrated in FIGS. 5A to 5D.

FIG. 10 is a flowchart of an algorithm of calculating the numbers of relation lines connected for respective codeword packet nodes. The numbers of relation lines for the respective codeword packet nodes can be calculated using the algorithm shown in FIG. 10 in the same manner as using the table as illustrated in FIGS. 5A to 5D.

First, related variables are initialized at operation S1010. Here, g1, g2, g3, . . . , gm denote the numbers of columns counted in m rows, and j denotes the number of relation lines. g1=g2=g3= . . . =gm are initialized as "0", and j is initialized as "1".

A row having a part corresponding to the codeword packet node and having the minimum size is searched for, and a new codeword packet node is allocated to the next column that does not correspond to the codeword packet node in the searched row at operation S1020. As illustrated in FIG. 10, a set {a, b, . . . , x} that satisfies a following inequality is obtained as shown in FIG. 10 and Equation (3).

$$ga/Na=ga/Nb= \ldots =gx/Nx<gz/Nz \quad (3)$$

In Equation (3), z denotes an integer in the range of 1 to m that does not belong to a set {a, b, c} when all of ga, gb, . . . , gx are not "0". Here, a, b, . . . , x denote the number of rows selected to be allocated with the codeword packet nodes. The number of elements of the set may be a certain number in the range of 1 to m.

If the set {a, b, . . . , z} is obtained as described above, the codeword packet nodes are successively allocated to the respective columns that belong to the rows Na, Nb, . . . , Nx at operation S1030. The degree of vj is set to a, and the degree of the next vj is set to b by increasing j by 1. This process is performed with respect to the elements of the set a, b, . . . , x.

The order of allocating the codeword packet nodes to the next columns is determined by increasing the values ga, gb, . . . , gx by 1, respectively at operation S1040. This process is performed repeatedly until the degrees of all vj are determined at operation S1050.

The process as shown in FIG. 10 will be described in more detail with reference to the table as shown in FIGS. 5A to 5D. If g1=g2=g3= . . . =g5 are initialized as "0" in a state that m is m=5, all values of g1/N1, g2/N2, . . . g5/N5 become "0". Accordingly, since these values are absolutely smaller than kz/Nz that is a positive value, the inequality at operation S1020 is naturally established with respect to the set {1, 2, 3, 4, 5}. Accordingly, 1, 2, 3, 4, and 5 relation lines are successively allocated to the initial codeword packet nodes v1 to v5 at operation S1030. Since j is initialized as j=1, v1 becomes v1=a=1, and then v2 becomes v2=b=2 as j becomes j=2. In this manner, v5 becomes v5=5, and thus g1 to g5 are set to g1=g1+1, g2=g2+1, . . . , g5=g5+1, respectively, at operation S1040. This indicates a state that v1 to v5 are successively allocated to the leftmost columns in the respective rows of the table, as shown in FIG. 5A.

In the state as shown in FIG. 5A, it can be seen that the column in the second row has the minimum size. The size of the column in the respective row is in reverse proportion to the number of columns in the corresponding row. Accordingly, a relation of 1/N2<1/N1=1/N3<1/N4=1/N5 is established. At operation (S1020), the set {2} is calculated, and accordingly, the number of relation lines of v6 that is the next codeword packet node is determined to be 2.

The value g2 that corresponds to the number of columns in the second row becomes 2. Accordingly, a following inequality is established:

$$1/N1=2/N2=1/N3<1/N4=1/N5$$

Accordingly, a set {1, 2, 3} is calculated. 1, 2, and 3 relation lines are assigned to v7, v8, and v9 that are the following codeword packet nodes. However, in the case of the same condition as shown in FIG. 5C, the codeword packet node may be preferentially allocated to a row having a small number of columns. Thus, v7, v8, and v9 may have relation lines numbered 1, 3, and 2, respectively.

Thereafter, since an inequality such as 3/N2<2/N1=2/N3=1/N4=1/N5 is established, a set {2} is calculated. The number of relation lines of the last v10 becomes 2. Consequently, through a software algorithm, the same result as the process as shown in FIGS. 5A to 5D can be obtained.

As described above, according to aspects of the present invention, the generation matrix that is used for a linear block coding can be properly constructed. Accordingly, a linear block coding can be performed with respect to a message in the unit of a packet, and thus data can be normally retrieved in spite of an erasure channel to improve the reliability of the data.

Aspects of the present invention can applied to various devices in the field of digital broadcast communications, such as a digital television receiver, a digital image capturing device, a broadcasting device, and so forth.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of constructing a generation matrix of a linear block code by a generation matrix construction device, the method comprising:

setting, by a setting unit of the generation matrix construction device, a number of relation lines connected for respective codeword packet nodes if a number of message packet nodes and the number of codeword packet nodes are selected;

setting, by the setting unit, a number of relation lines connected for the respective message packet nodes, a total number of relation lines set for the message packet nodes equaling a total number of relation lines set for the codeword packet nodes;

connecting, by the setting unit, the message packet nodes and the codeword packet nodes with the relation lines; and constructing, by a generation matrix construction unit of the generation matrix construction device, the generation matrix of the linear block code based on the connection relation between the message packet nodes and the codeword packet nodes;

wherein the constructing of the generation matrix comprises defining the generation matrix of the linear block code by providing a number of rows equal to the number of the message packet nodes and a number of columns equal to the number of the codeword packet nodes, or alternatively, by providing a number of rows equal to the number of the codeword packet nodes and a number of columns equal to the number of the message packet nodes and by entering "1" in matrix positions that correspond to the message packet nodes and the codeword packet nodes connected to each other and entering "0" in remaining matrix positions.

2. The method of claim 1, wherein the setting of the number of the relation lines connected for the codeword packet nodes comprises:
- calculating a distribution of the numbers of relation lines for all of the codeword packet nodes;
- calculating a number of codeword packet nodes having i relation lines for respective i values;
- constructing a table having a number of rows equal to a maximum value among the i values and a number of columns equal to a number of codeword packet nodes having a number of relation lines corresponding to the respective rows; and
- determining the numbers of relation lines for the respective codeword packet nodes by successively assigning each of the codeword packet nodes to cells of the constructed table;
- wherein i is an integer in the range of 1 to k (where, k is the total number of the message packet nodes).

3. The method of claim 1, wherein the connecting of the message packet nodes and the codeword packet nodes comprises:
- successively numbering the relation lines set for all of the codeword packet nodes;
- successively numbering the relation lines set for all of the message packet nodes;
- determining, in a predetermined order, the numbers of relation lines for the message packet nodes corresponding to the numbers of relation lines set for all of the codeword packet nodes; and
- connecting the relation lines having the determined numbers to each other so that one relation line is connected between one message packet node and one codeword packet node.

4. A linear block coding device comprising:
- a transmitter-side storage unit to store a matrix generated according to claim 1; and
- a coding unit to perform a linear block coding of input message packets using the matrix stored in the transmitter-side storage unit if the message packets are inputted, and to output codeword packets for the respective message packets.

5. A linear block decoding device comprising:
- a receiver-side storage unit to store a matrix generated according to claim 1; and
- a decoding unit to perform a linear block decoding of input codeword packets using the matrix stored in the receiver-side storage unit if the codeword packets are inputted, and to retrieve data carried on an erasure channel.

6. A method of constructing a generation matrix of a linear block code by a generation matrix construction device, the method comprising:
- setting, by a setting unit of the generation matrix construction device, a number of relation lines connected for respective codeword packet nodes if a number of message packet nodes and the number of codeword packet nodes are selected;
- setting, by the setting unit, a number of relation lines connected for the respective message packet nodes, a total number of relation lines set for the respective message packet nodes equaling a total number of relation lines set for the respective codeword packet nodes;
- connecting, by the setting unit, the message packet nodes and the codeword packet nodes with the relation lines; and
- constructing, by a generation matrix construction unit of the generation matrix construction device, the generation matrix of the linear block code based on the connection relation between the message packet nodes and the codeword packet nodes;
- wherein the setting of the number of the relation lines connected for the codeword packet nodes comprises:
  - calculating a distribution of the numbers of relation lines for all of the codeword packet nodes;
  - calculating a number of codeword packet nodes having i relation lines for respective i values;
  - constructing a table having a number of rows equal to a maximum value among the i values and a number of columns equal to a number of codeword packet nodes having a number of relation lines corresponding to the respective rows, the constructing of the table including constructing the table so that the respective rows have the same size and the size of the column existing in the respective row is in reverse proportion to the number of columns for the respective row; and
  - determining the numbers of relation lines for the respective codeword packet nodes by successively assigning each of the codeword packet nodes to cells of the constructed table;
  - wherein i is an integer in the range of 1 to k (where, k is the total number of the message packet nodes).

7. The method of claim 6, wherein the determining of the numbers of relation lines comprises assigning a number of codeword packet nodes equal to the number of rows to cells the constructed table in a predetermined order along the leftmost column of the constructed table, confirming start positions of the following columns, and assigning the remaining codeword packet nodes to cells in the columns from the first-starting row according to the confirmed start positions.

8. A method of constructing a generation matrix of a linear block code by a generation matrix construction device, the method comprising:
- setting, by a setting unit of the generation matrix construction device, a number of relation lines connected for respective codeword packet nodes if a number of message packet nodes and the number of codeword packet nodes are selected;
- setting, by the setting unit, a number of relation lines connected for the respective message packet nodes, a total number of relation lines set for the respective message packet nodes equaling a total number of relation lines set for the respective codeword packet nodes;
- connecting, by the setting unit, the message packet nodes and the codeword packet nodes with the relation lines; and
- constructing, by a generation matrix construction unit of the generation matrix construction device, the generation matrix of the linear block code based on the connection relation between the message packet nodes and the codeword packet nodes,
- wherein the setting of the relation lines connected for the message packet nodes comprises:
  - calculating a sum of relation lines of all of the codeword packet nodes;

dividing the calculated sum of the relation lines by the number of message packet nodes, and setting the quotient obtained as the number of relation lines for all of the message packet nodes; and additionally setting a number of relation lines with respect to the message packet nodes corresponding to the remainder, if a remainder exists as a result of division.

9. A method of constructing a generation matrix of a linear block code by a generation matrix construction device, the method comprising:

setting, by a setting unit of the generation matrix construction device, a number of relation lines connected for respective codeword packet nodes if a number of message packet nodes and the number of codeword packet nodes are selected;

setting, by the setting unit, a number of relation lines connected for the respective message packet nodes, a total number of relation lines set for the respective message packet nodes equaling a total number of relation lines set for the respective codeword packet nodes;

connecting, by the setting unit, the message packet nodes and the codeword packet nodes with the relation lines, the number of which is as many as the total number of relation lines; and constructing, by a generation matrix construction unit of the generation matrix construction device, the generation matrix of the linear block code based on the connection relation between the message packet nodes and the codeword packet nodes;

wherein the connecting of the message packet nodes and the codeword packet nodes comprises:

successively numbering the relation lines set for all of the codeword packet nodes;

successively numbering the relation lines set for all of the message packet nodes;

determining, in a predetermined order, the numbers of relation lines for the message packet nodes corresponding to the numbers of relation lines set for all of the codeword packet nodes; and connecting the relation lines having the determined numbers to each other so that one relation line is connected between one message packet node and one codeword packet node, wherein the determining the numbers of relation lines comprises calculating the number of relation lines for the corresponding message packet nodes by successively substituting the numbers of relation lines set for all of the codeword packet nodes into the following equation:

$$m = f(j) = (P*j + D_{(j \mod Q)}) \mod T$$

where, m denotes the number of relation lines set in a message packet, j denotes the number of relation lines set in a codeword packet node, $P, D_0, D_1, D_2, \ldots, D_{Q-1}$ denote predetermined real numbers, and T is the total number of the relation lines.

10. A non-transitory recording medium in which an execution code to execute a method of constructing the generation matrix is stored, the method comprising:

setting a number of relation lines connected for respective codeword packet nodes if a number of massage packet nodes and the number of codeword packet nodes are selected;

setting a number of relation lines connected for the respective message packet nodes, a total number of relation lines set for the respective message packet nodes equaling a total number of relation lines set for the respective codeword packet nodes;

connecting the message packet nodes to the codeword packet nodes based on the relation lines; and constructing the generation matrix of the linear block code based on a connection relation between the message packet nodes and the codeword packet nodes;

wherein the constructing of the generation matrix comprises defining the generation matrix of the linear block code by providing a number of rows equal to the number of the message packet nodes and a number of columns equal to the number of the codeword packet nodes, or alternatively, by providing a number of rows equal to the number of the codeword packet nodes and a number of columns equal to the number of the message packet nodes and by entering "1" in matrix positions that correspond to the message packet nodes and the codeword packet nodes connected to each other and entering "0" in remaining matrix positions.

11. A non-transitory recording medium of claim 10, wherein the setting of the number of the relation lines connected for the codeword packet nodes comprises:

calculating a distribution of the numbers of relation lines for all of the codeword packet nodes;

calculating the number of codeword packet nodes having i relation lines for respective i values;

constructing a table having a number of rows equal to a maximum value among the i values and a number of columns equal to the number of codeword packet nodes having a number of relation lines corresponding to the respective rows; and determining the numbers of relation lines for the respective codeword packet nodes by successively assigning each of the codeword packet nodes to a cell of the constructed table;

wherein i is an integer in the range of 1 to k (where, k is the total number of the message packet nodes).

12. A non-transitory recording medium in which an execution code to execute a method of constructing the generation matrix is stored, the method comprising:

setting a number of relation lines connected for respective codeword packet nodes if a number of massage packet nodes and the number of codeword packet nodes are selected;

setting a number of relation lines connected for the respective message packet nodes;

connecting the message packet nodes to the codeword packet nodes based on the relation lines; and constructing the generation matrix of the linear block code based on a connection relation between the message packet nodes and the codeword packet nodes, wherein the setting of the number of the relation lines connected for the codeword packet nodes comprises:

calculating a distribution of the numbers of relation lines for all of the codeword packet nodes;

calculating the number of codeword packet nodes having i relation lines for respective i values;

constructing a table having a number of rows equal to a maximum value among the i values and a number of columns equal to the number of codeword packet nodes having a number of relation lines corresponding to the respective rows; and determining the numbers of relation lines for the respective codeword packet nodes by successively assigning each of the codeword packet nodes to a cell of the constructed table;

wherein i is an integer in the range of 1 to k (where, k is the total number of the message packet nodes), and wherein the setting of the relation lines connected for the message packet nodes comprises:
- calculating a sum of relation lines of all of the codeword packet nodes;
- dividing the calculated sum of the relation lines by the number of message packet nodes, and setting the quotient obtained as the number of relation lines for all of the message packet nodes; and
- additionally setting a number of relation lines with respect to the message packet nodes corresponding to the remainder, if a remainder exists as a result of division.

13. The non-transitory recording medium of claim 12, wherein the connecting of the message packet nodes and the codeword packet nodes comprises:
- successively numbering the relation lines set for all of the codeword packet nodes;
- successively numbering the relation lines set for all of the message packet nodes;
- determining the numbers of relation lines for the message packet nodes corresponding to the numbers of relation lines set for all of the codeword packet nodes by successively substituting the numbers of relation lines set for all of the codeword packet nodes in a the following equation:

$$m = f(j) = (P*j + D_{(j \bmod Q)}) \bmod T$$

where, m denotes the numbers of relation lines set in a message packet, j denotes the number of relation lines set in a codeword packet node, P, $D_0$, $D_1$, $D_2$, ..., $D_{Q-1}$ denote predetermined real numbers, and T is the number of the whole relation lines; and
- connecting the relation lines having the determined numbers to each other so that one relation line is connected between one message packet node and one codeword packet node.

14. The non-transitory recording medium of claim 13, wherein the constructing of the generation matrix comprises defining the generation matrix of the linear block code by providing a number of rows equal to the number of the message packet nodes and a number of columns equal to the number of the codeword packet nodes and by entering "1" in matrix positions that correspond to the message packet nodes and the codeword packet nodes connected to each other and entering "0" in remaining matrix positions.

15. A device to construct a generation matrix of a linear block code, comprising:
- a setting unit to set a number of relation lines connected for respective codeword packet nodes and a number of the relation lines connected for respective message packet nodes, if a number of the massage packet nodes and a number of the codeword packet nodes are selected; and
- a generation matrix construction unit to construct the generation matrix of the linear block code according to a connection relation between the message packet nodes and the codeword packet nodes that are connected to each other with the relation lines, the number of which is as many as the set number;

wherein the generation matrix construction unit comprises:
- a connection unit to successively number the relation lines set for all of the codeword packet nodes and the relation lines set for all of the message packet nodes, to determine in a predetermined order the numbers of relation lines for the message packet nodes corresponding to the numbers of relation lines set for the whole codeword packet nodes, and to connect the determined relation lines to each other; and
- a construction unit to construct the generation matrix by providing a number of rows equal to the total number of the message packet nodes and a number of columns equal to the total number of the codeword packet nodes, or alternatively, by providing a number of rows equal to the number of the codeword packet nodes and a number of columns equal to the number of the message packet nodes and by entering "1" in matrix positions that correspond to the message packet nodes and the codeword packet nodes connected to each other and entering "0" in remaining matrix positions.

16. The device of claim 15, wherein the setting unit comprises:
- a calculation unit to calculate a distribution of the numbers of relation lines for all of the codeword packet nodes and to calculate the number of codeword packet nodes having i relation lines among all of the codeword packet nodes for respective i values; and
- a first degree determining unit to construct a table having a number of rows equal to a maximum value among the i values and a number of columns equal to the number of codeword packet nodes having a number of relation lines corresponding to the respective rows and to determine the numbers of relation lines for the respective codeword packet nodes by successively making the whole codeword packet nodes correspond to the constructed table;

wherein i is an integer in the range of 1 to k and k is the total number of the message packet nodes.

17. The device of claim 15, wherein the connection unit confirms the numbers of relation lines for the corresponding message packet nodes by successively substituting the numbers of relation lines set for the codeword packet nodes in the following equation:

$$m = f(j) = (P* + D_{(j \bmod Q)}) \bmod T$$

where, m denotes the number of relation lines set in a message packet, j denotes the number of relation lines set in a codeword packet node, P, $D_0$, $D_1$, $D_2$, ..., $D_{Q-1}$ denote predetermined real numbers, and T is the number of the whole relation lines.

18. A device to construct a generation matrix of a linear block code, comprising:
- a setting unit to set a number of relation lines connected for respective codeword packet nodes and a number of the relation lines connected for respective message packet nodes, if a number of the massage packet nodes and a number of the codeword packet nodes are selected; and
- a generation matrix construction unit to construct the generation matrix of the linear block code according to a connection relation between the message packet nodes and the codeword packet nodes that are connected to each other with the relation lines, the number of which is as many as the set number, wherein the setting unit comprises:
- a calculation unit to calculate a distribution of the numbers of relation lines for all of the codeword packet nodes and to calculate the number of codeword packet nodes having i relation lines among all of the codeword packet nodes for respective i values; and
- a first degree determining unit to construct a table having a number of rows equal to a maximum value among the i values and a number of columns equal to the number of codeword packet nodes having a number of relation lines corresponding to the respective rows and to determine the numbers of relation lines for the respective codeword packet nodes by successively making the whole codeword packet nodes correspond to the constructed table;

wherein i is an integer in the range of 1 to k and k is the total number of the message packet nodes; and wherein the first degree determining unit constructs the table so that the respective rows have the same size and the size of the column existing in the respective row is in reverse proportion to the number of columns for the respective row.

19. The device of claim 18, wherein the first degree determining unit assigns a number of the codeword packet nodes equal to the number of rows to cells in the constructed table in a predetermined order along the leftmost column of the constructed table, confirms a size of columns of the respective row, and assigning remaining codeword packet nodes to cells in a smallest column of the respective row.

20. A device to construct a generation matrix of a linear block code, comprising:

a setting unit to set a number of relation lines connected for respective codeword packet nodes and a number of the relation lines connected for respective message packet nodes, if a number of the massage packet nodes and a number of the codeword packet nodes are selected; and a generation matrix construction unit to construct the generation matrix of the linear block code according to a connection relation between the message packet nodes and the codeword packet nodes that are connected to each other with the relation lines, the number of which is as many as the set number, wherein the setting unit comprises:

a calculation unit to calculate a distribution of the numbers of relation lines for all of the codeword packet nodes and to calculate the number of codeword packet nodes having i relation lines among all of the codeword packet nodes for respective i values; and a first degree determining unit to construct a table having a number of rows equal to a maximum value among the i values and a number of columns equal to the number of codeword packet nodes having a number of relation lines corresponding to the respective rows and to determine the numbers of relation lines for the respective codeword packet nodes by successively making the whole codeword packet nodes correspond to the constructed table;

a second degree determining unit to calculate a sum of the relation lines of all of the codeword packet nodes, to divide the calculated sum of the relation lines by the total number of the message packet nodes, to set the resulting quotient as the number of relation lines for the whole message packet nodes, and to additionally set remaining relation lines with respect to the message packet nodes if a remainder exists as a result of division; and wherein i is an integer in the range of 1 to k and k is the total number of the message packet nodes.

* * * * *

UNITED STATES PATENT AND TRADEMARK OFFICE
CERTIFICATE OF CORRECTION

PATENT NO.         : 7,792,135 B2
APPLICATION NO.    : 11/971254
DATED              : September 7, 2010
INVENTOR(S)        : Jung-pil Yu It is certified that error appears in the above-identified patent and that said Letters Patent is hereby corrected as shown below:

Title Page Item (57) (Abstract), Line 4 delete "massage packet" and insert -- message packet --, therefor.

Column 17, Line 63 in Claim 10, delete "massage packet" and insert -- message packet --, therefor.

Column 18, Line 43 in Claim 12, delete "massage packet" and insert -- message packet --, therefor.

Column 19, Line 26 in Claim 13, delete "a the" and insert -- the --, therefor.

Column 19, Line 53 in Claim 15, delete "massage packet" and insert -- message packet --, therefor.

Column 20, Line 38 in Claim 17, delete " $m=f(j)=(P*+D_{(j\ mod\ Q)}) \mod T$ " and insert -- $m=f(j)=(P*j+D_{(j\ mod\ Q)}) \mod T$ --, therefor.

Column 20, Line 50 in Claim 18, delete "massage packet" and insert -- message packet --, therefor.

Column 21, Line 26 in Claim 20, delete "massage packet" and insert -- message packet --, therefor.

Signed and Sealed this
Eighth Day of March, 2011

David J. Kappos
*Director of the United States Patent and Trademark Office*